US012786630B2

(12) United States Patent
Andrews et al.

(10) Patent No.: US 12,786,630 B2
(45) Date of Patent: Nov. 3, 2026

(54) MULTIBAND BASS MANAGEMENT IN VEHICLE AUDIO SYSTEM

(71) Applicant: Atieva, Inc., Newark, CA (US)

(72) Inventors: Peter J. Andrews, Hayward, CA (US); Antonios Karalis, Palo Alto, CA (US); Arvind Agrawal, San Jose, CA (US)

(73) Assignee: Atieva, Inc., Newark, CA (US)

( * ) Notice: Subject to any disclaimer, the term of this patent is extended or adjusted under 35 U.S.C. 154(b) by 156 days.

(21) Appl. No.: 18/720,181

(22) PCT Filed: Dec. 14, 2022

(86) PCT No.: PCT/US2022/081584
§ 371 (c)(1),
(2) Date: Jun. 14, 2024

(87) PCT Pub. No.: WO2023/114864
PCT Pub. Date: Jun. 22, 2023

(65) Prior Publication Data

US 2025/0056159 A1 Feb. 13, 2025

Related U.S. Application Data

(60) Provisional application No. 63/265,447, filed on Dec. 15, 2021.

(51) Int. Cl.
*H04R 3/12* (2006.01)
*H04R 1/26* (2006.01)

(52) U.S. Cl.
CPC ................. *H04R 3/12* (2013.01); *H04R 1/26* (2013.01); *H04R 2499/13* (2013.01)

(58) Field of Classification Search
CPC ......... H04R 3/12; H04R 1/26; H04R 2499/13
See application file for complete search history.

(56) References Cited

U.S. PATENT DOCUMENTS

| | | | | |
|---|---|---|---|---|
| 4,243,840 A * | 1/1981 | Kates | H04R 3/14 | 381/99 |
| 4,905,284 A * | 2/1990 | Kwang | H04R 3/14 | 381/100 |

(Continued)

FOREIGN PATENT DOCUMENTS

| | | |
|---|---|---|
| CN | 113784258 A | 12/2021 |
| GB | 394325 A | 6/1933 |
| WO | 2014107714 A1 | 7/2014 |

OTHER PUBLICATIONS

Extended European Search Report for European Application No. 22908671.5, dated Oct. 9, 2025, 11 pages.

(Continued)

*Primary Examiner* — Daniel R Sellers
(74) *Attorney, Agent, or Firm* — Brake Hughes Bellermann LLP

(57) ABSTRACT

A method of performing multiband bass management in a vehicle comprises: separating, by an audio system in a vehicle, first bass audio information from an audio signal, the first bass audio information comprising all contents of the audio signal below a first frequency: providing second bass audio information to each of multiple woofers of the audio system of the vehicle, the second bass audio information comprising all contents of the first bass audio information above a second frequency: and providing third bass audio information to fewer than all of the multiple woofers, the third bass audio information comprising all contents of the first bass audio information other than the second bass audio information.

15 Claims, 3 Drawing Sheets

200

(56) References Cited

U.S. PATENT DOCUMENTS

| | | | | |
|---|---|---|---|---|
| 5,602,367 | A * | 2/1997 | Meyer | H04R 1/2819 181/160 |
| 9,725,047 | B2 | 8/2017 | Orellana et al. | |
| 10,893,361 | B2 | 1/2021 | Chapman et al. | |
| 2006/0233378 | A1* | 10/2006 | Kim | H04S 7/307 381/1 |
| 2008/0285775 | A1 | 11/2008 | Christoph et al. | |
| 2009/0190773 | A1* | 7/2009 | Katayama | H04R 5/02 381/86 |
| 2011/0286602 | A1 | 11/2011 | Yuen et al. | |
| 2014/0031962 | A1* | 1/2014 | Akatsu | H04R 3/00 700/94 |
| 2016/0234599 | A1 | 8/2016 | Beauchamp | |
| 2018/0020290 | A1* | 1/2018 | Ludwig | H04R 1/2846 |
| 2018/0020314 | A1 | 1/2018 | Sheen | |
| 2019/0208322 | A1* | 7/2019 | Chapman | H04R 1/26 |
| 2020/0014993 | A1* | 1/2020 | Alexander | H04R 1/26 |
| 2020/0053466 | A1 | 2/2020 | Wu | |

OTHER PUBLICATIONS

Anonymous, ""Amazon.com: DS18 XM6LD 6-way 1-15 Active Crossover—High/Low Pass, 2, 4, or 6 Channel Selector, with Remote Subwoofer Control—Perfect Frequency Distribution System Ensures Clarity and Peak Efficiency, BLACK : Electronics"", Jun. 17, 2016 (Jun. 17, 2016), pp. 1-9, XP093320238, Retrieved from the Internet: URL:https://us.amazon.com/DS18-XM6LD-6-way-Active-Crossover/dp/B01HGOXOIW, [retrieved on Sep. 30, 2025].

International Search Report and Written Opinion for PCT Application No. PCT/US2022/081584, mailed on Mar. 14, 2023, 10 pages.

J.D. Johnston et al: "Sum-Difference Stereo Transform Coding," Acoustics, Speech, and Signal Processing, IEEE International Conference on, vol. 2, pp. 569-572, IEEE Computer Society, 1992.

* cited by examiner

MULTIBAND BASS MANAGEMENT IN VEHICLE AUDIO SYSTEM

CROSS-REFERENCE TO RELATED APPLICATION

This application is a 35 U.S.C. § 137 National Phase Entry Application from PCT Application No. PCT/US2022/081584, filed on Dec. 14, 2022, entitled "MULTIBAND BASS MANAGEMENT IN VEHICLE AUDIO SYSTEM", and designating the U.S., which claims priority to U.S. Patent Application No. 63/265,447, filed on Dec. 15, 2021, and entitled "MULTIBAND BASS MANAGEMENT IN VEHICLE AUDIO SYSTEM," the disclosures of which are incorporated by reference herein in their entireties.

TECHNICAL FIELD

This disclosure relates to performing multiband bass management in an audio system of a vehicle.

BACKGROUND

While vehicles have had audio systems for decades, they have generally not been able to provide a listening experience close to the most sophisticated systems used in public venues such as movie theaters or the rapidly developing field of high-end home surround sound systems. The advancement and complexification of vehicle technology has changed the playing field in this regard, by providing vehicles with significantly more powerful computer processing resources, and by making vehicles significantly quieter while driving. However, some physical constraints particular to vehicles can introduce additional challenges that may not otherwise exist.

SUMMARY

In a first aspect, a method of performing multiband bass management in a vehicle comprises: separating, by an audio system in a vehicle, first bass audio information from an audio signal, the first bass audio information comprising all contents of the audio signal below a first frequency; providing second bass audio information to each of multiple woofers of the audio system of the vehicle, the second bass audio information comprising all contents of the first bass audio information above a second frequency; and providing third bass audio information to fewer than all of the multiple woofers, the third bass audio information comprising all contents of the first bass audio information other than the second bass audio information.

Implementations can include any or all of the following features. The third bass audio information is provided to a first woofer of the multiple woofers. The third bass audio information is provided to the first woofer based on the first woofer having a greater enclosure size than at least a second woofer of the multiple woofers. The third bass audio information is provided to the first woofer based on woofer type. The third bass audio information is provided to multiple first woofers at a trunk region of the vehicle. The first woofer is positioned at a trunk region of the vehicle. A second woofer of the multiple woofers is positioned at a front of the vehicle, and wherein the second bass audio information, but not the third bass audio information, is provided to the second woofer. The vehicle has multiple second woofers at the front of the vehicle.

In a second aspect, an audio system for a vehicle comprises: a non-woofer speaker; first and second woofers; a first filter separating first bass audio information from an audio signal before a remainder of the audio signal is provided to the non-woofer speaker, the first bass audio information comprising all contents of the audio signal below a first frequency; a second filter for providing second bass audio information to the first and second woofers, the second bass audio information comprising all contents of the first bass audio information above a second frequency; and a third filter for providing third bass audio information to the first woofer and not to the second woofer, the third bass audio information comprising all contents of the first bass audio information other than the second bass audio information.

Implementations can include any or all of the following features. The first woofer has a greater enclosure size than the second woofer. The first woofer is of a different type than the second woofer. The audio system further comprises at least two first woofers, wherein the second bass audio information is provided to the at least two first woofers, and wherein the third bass audio information is provided to the at least two first woofers. The first woofer is located at a trunk region of the vehicle. The second woofer is positioned at a front of the vehicle. The audio system further comprises at least two second woofers positioned at the front of the vehicle, wherein the second bass audio information is provided to the at least two second woofers, and wherein the third bass audio information is not provided to the at least two second woofers.

BRIEF DESCRIPTION OF DRAWINGS

Like reference symbols or numerals in the various drawings indicate like elements.

DETAILED DESCRIPTION

The present disclosure gives examples of systems and techniques that perform multiband bass management in an audio system of a vehicle having multiple woofers. Different characteristics and/or performance characteristics of the woofers in the vehicle can be taken into account in controlling which woofer(s) of all the woofers in the vehicle should play which portion(s) of bass audio. For example, some bass audio can be played by all of the vehicle's woofers, whereas the bass audio having the lowest frequencies can instead be played only by one or more of the woofers that has relatively better performance at such frequencies. For example, all woofers may have approximately the same size or technical characteristics, and the performance difference can stem largely from the respective enclosure sizes for the woofers. As another example, woofers can have different performance characteristics because they are of different types. The present disclosure can address these and/or other challenges.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. Any person carried by a vehicle can be referred to as a "driver" or a "passenger" of the vehicle, regardless whether or to what extent the person is driving the vehicle, or whether the person has access to all or only some of the controls for driving the vehicle, or whether the person lacks controls for driving the vehicle.

Examples described herein refer to a filter. As used herein, a filter includes any technology that can distinguish between (e.g., separate, segregate, or sort) two or more components of audio information from each other. For example, in digital signal processing, a filter can be used to divide an audio signal into two or more of its constituent parts.

Figure 1:
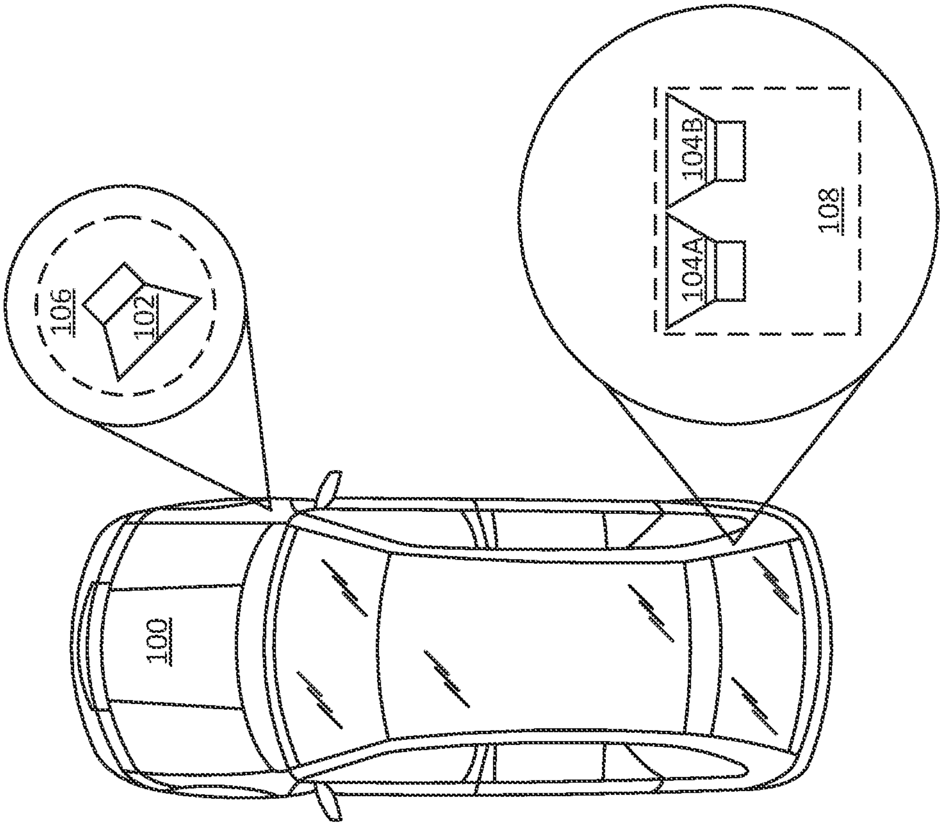
FIG. 1 schematically shows an example of a vehicle with woofers at multiple locations.

FIG. 1 schematically shows an example of a vehicle 100 with woofers 102 and 104A-104B at multiple locations. The vehicle 100 is here shown in a top view. The woofers 102 and 104A-104B are positioned (e.g., mounted) inside the vehicle 100 (such as, but not limited to, within a passenger compartment or in a trunk space). The woofers 102 and 104A-104B, represented by generic speaker symbols, are here schematically shown outside the enclosure of the vehicle 100 for clarity. In some implementations, the woofers 102 and 104A-104B (e.g., their respective voice coils) can be approximately of the same size as each other and/or have comparable technical specifications. However, as exemplified below, the performances (e.g., low-frequency performances) of all the woofers 102 and 104A-104B are not necessarily the same or similar to each other. The woofers 102 and/or 104A-104B can be used with one or more other examples described elsewhere herein.

The woofer 102 is schematically shown as having an enclosure 106. Generally, an enclosure can seek to prevent or reduce the occurrence of sound cancellation between front sound radiation and rear sound radiation of the speaker. In some implementations, the enclosure 106 can be relatively smaller than the enclosures for some or all other woofers of the vehicle 100. For example, the woofer 102 can be mounted in the A pillar of the vehicle 100 or in another part of the vehicle body. As such, the enclosure 106 can be relatively limited in size due to structural characteristics of the vehicle 100. For the above or other reasons, the woofer 102 can have particular low-frequency performance characteristics. In some implementations, the vehicle 100 can have two or more instances of the woofer 102 (e.g., one in each of the two A pillars).

The woofers 104A-104B are schematically shown as having an enclosure 108. In some implementations, the enclosure 108 can be relatively larger than the enclosures for some or all other woofers of the vehicle 100. For example, the woofers 104A-104B can be mounted toward the rear of the vehicle 100 (e.g., at a trunk region of the vehicle 100, such as backed into a trunk space). As such, the enclosure 108 can be relatively generously sized. As indicated, the vehicle can have more than one voice coil in or adjacent the trunk space (e.g., two voice coils represented by the woofers 104A-104B). For the above or other reasons, the woofers 104A-104B can have particular low-frequency performance characteristics. For example, the low-frequency performance characteristics of the woofers 104A-104B can be better than the low-frequency performance characteristics of the woofer 102. Systems and techniques according to the present disclosure can perform multiband bass management, for example to address the situation just mentioned.

Figure 3:
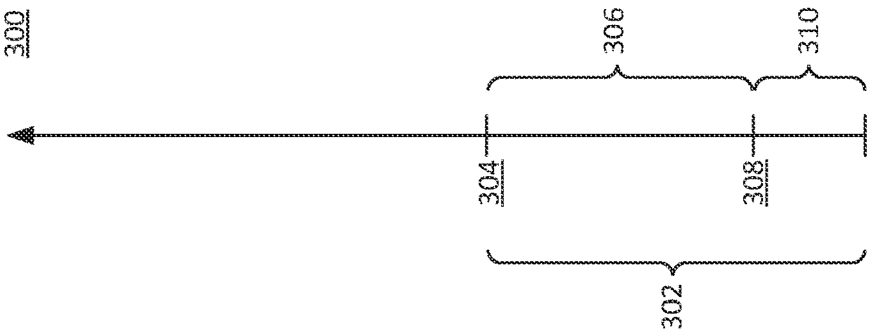
FIG. 3 shows an example of multiband bass management.
Figure 2:
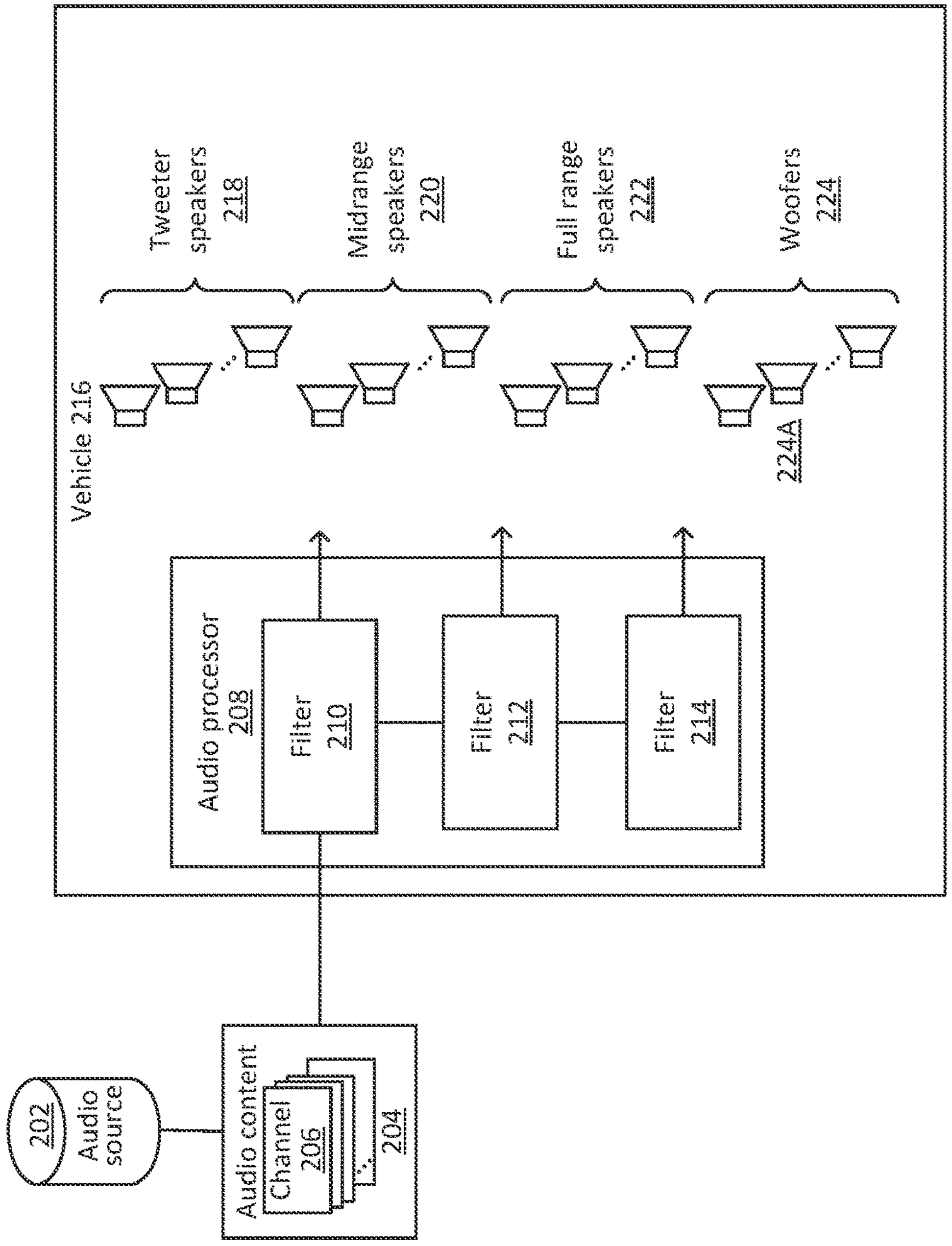
FIG. 2 shows an example of a vehicle audio system that can perform multiband bass management.

FIG. 2 shows an example of a vehicle audio system 200 that can perform multiband bass management. FIG. 3 shows an example 300 of multiband bass management in form of an axis representing frequencies of audio information. The vehicle audio system 200 and/or the example 300 can be used with one or more other examples described elsewhere herein. The vehicle audio system 200 can be implemented using some or all examples described below with reference to FIG. 4.

The vehicle audio system 200 includes at least one audio source 202. The audio source 202 can be local to the vehicle (e.g., a local hard drive, memory, or other audio storage device), or can be remote (e.g., a network connection to one or more remotely located servers that supply audio content in one or more coding formats). Here, audio content 204 from the audio source 202 is schematically shown as including channels 206 of audio information. For example, the channels 206 can include one or more of lateral channels, height channels, or woofer channels. One or more channels can be used.

The vehicle audio system 200 can include an audio processor 208 that can receive or obtain from the audio source 202 the audio content 204. The audio processor 208 includes a filter 210 that can separate bass audio information 302 from an audio signal of the audio content 204. The bass audio information 302 includes all contents of the audio signal below a frequency 304. The filter 210 can provide (as schematically illustrated by an arrow) a remainder of the audio signal other than the bass audio information 302 to one or more speakers of tweeter speakers 218, midrange speakers 220, or full range speakers 222, exemplified below.

The audio processor 208 includes a filter 212 that can provide (as schematically illustrated by an arrow) bass audio information 306 to each one of woofers 224 of the audio system 200. The bass audio information 306 includes all contents of the bass audio information 302 above a frequency 308. The frequency 308 is lower than the frequency 304. That is, all bass audio information above the frequency 308 is played by all of the woofers 224 in the audio system 200. For example, the woofers 224 can include all of the woofers 102 and 104A-104B in FIG. 1 and/or other woofers.

The audio processor 208 includes a filter 214 that can provide (as schematically illustrated by an arrow) bass audio information 310 to fewer than all of the woofers 224. The bass audio information 310 includes all contents of the bass audio information 302 other than the bass audio information 306. The bass audio information 310 can be provided to a subset including one or more woofers of the woofers 224, such as a woofer 224A. That is, the woofer 224A can be provided all of the bass audio information 302, including both the bass audio information 306 and the bass audio information 310. By contrast, another one of the woofers 224 (e.g., the woofer 102 in FIG. 1), can be provided the bass audio information 306 but not the bass audio information 310.

In some implementations, the woofer 224A can include a woofer with better low-frequency performance characteristics than at least another one of the woofers 224. For example, the woofer 224A can include one or both of the woofers 104A-104B in FIG. 1. The bass audio information 310 can be provided to the woofer 224A based on the woofer 224A having a greater enclosure size than at least another one of the woofers 224. The bass audio information 310 can be provided to the woofer 224A based on the woofer 224A being of a different type than at least another one of the woofers 224.

At least the audio processor 208 can be implemented in a vehicle 216, as schematically indicated. The vehicle 216 includes speakers of one or more types, including, but not limited to, tweeter speakers, midrange speakers, full range speakers, and/or woofers. Each speaker (type) can include one or more transducers (e.g., a voice coil) for converting an electric input to sound waves. The vehicle 216 can include n number of the tweeter speakers 218 that can have any of multiple arrangements within the vehicle 216. The vehicle 216 can include m number of the midrange speakers 220 that can have any of multiple arrangements within the vehicle 216. The vehicle 216 can include p number of the full range speakers 222 (sometimes referred to as twiddler speakers) that can have any of multiple arrangements within the vehicle 216. The vehicle 216 can include q number of the woofers 224 (e.g., subwoofers) that can have any of multiple arrangements within the vehicle 216. A set of one or more speakers of the tweeter speakers 218, the midrange speakers 220, and/or the full range speakers 222 can be referred to as a non-woofer speaker.

The above examples illustrate that an audio system for a vehicle (e.g., the audio system 200) can include a non-woofer speaker (e.g., one or more speakers of the tweeter speakers 218, the midrange speakers 220, and/or the full range speakers 222); first and second woofers (e.g., the woofers 104A and 102 in FIG. 1); a first filter (e.g., the filter 210) separating first bass audio information (e.g., the bass audio information 302) from an audio signal (e.g., the audio content 204) before a remainder of the audio signal is provided to the non-woofer speaker, the first bass audio information comprising all contents of the audio signal below a first frequency (e.g., the frequency 304); a second filter (e.g., the filter 212) for providing second bass audio information (e.g., the bass audio information 306) to the first and second woofers, the second bass audio information comprising all contents of the first bass audio information above a second frequency (e.g., the frequency 308); and a third filter (e.g., the filter 214) for providing third bass audio information (e.g., the bass audio information 310) to the first woofer and not to the second woofer, the third bass audio information comprising all contents of the first bass audio information other than the second bass audio information.

Figure 4:
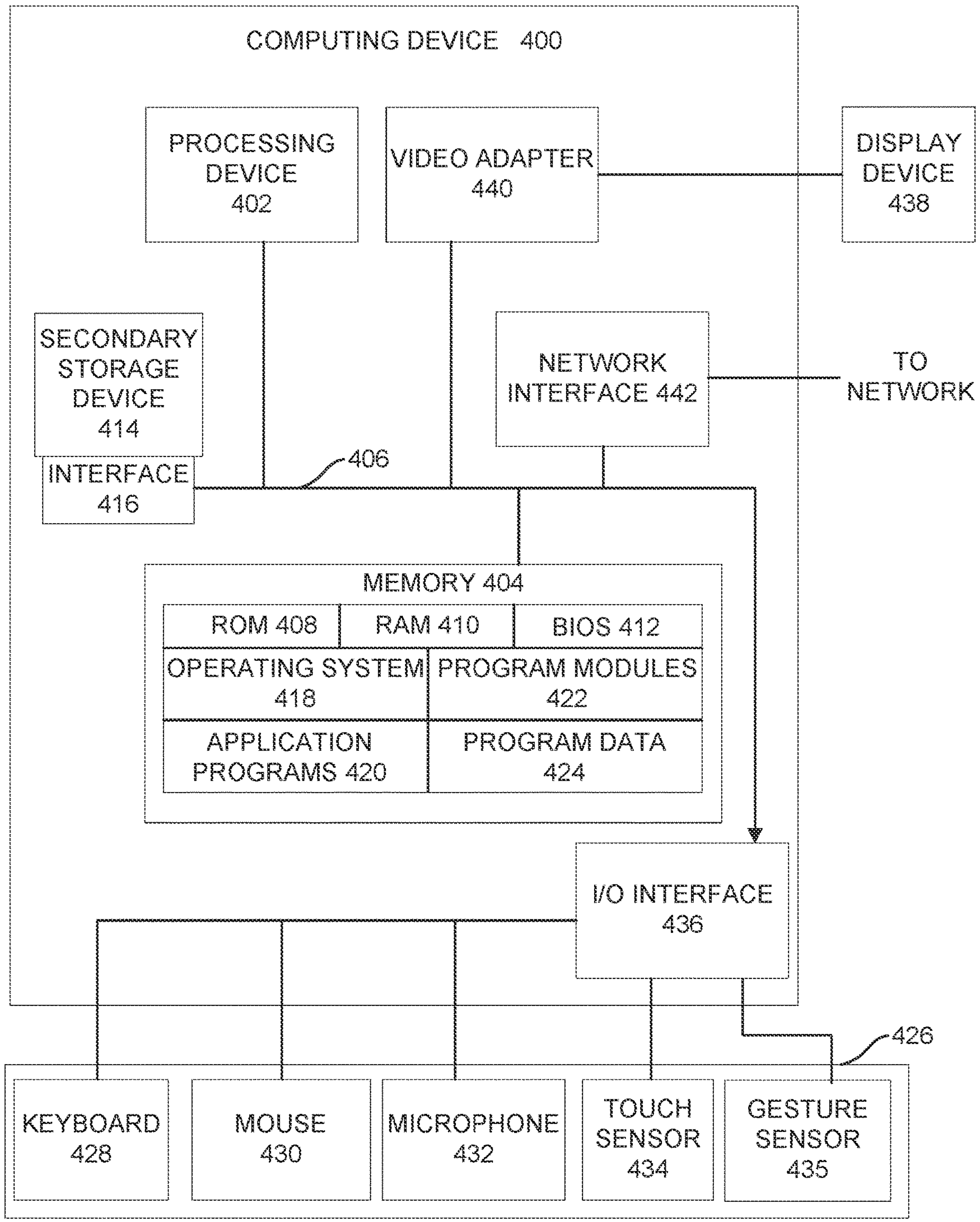
FIG. 4 illustrates an example architecture of a computer system.

FIG. 4 illustrates an example architecture of a computing device 400 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 4 can be used to execute the operating system, application programs, and/or software modules (including the software engines) described herein.

The computing device 400 includes, in some embodiments, at least one processing device 402 (e.g., a processor), such as a central processing unit (CPU). A variety of processing devices are available from a variety of manufacturers, for example, Intel or Advanced Micro Devices. In this example, the computing device 400 also includes a system memory 404, and a system bus 406 that couples various system components including the system memory 404 to the processing device 402. The system bus 406 is one of any number of types of bus structures that can be used, including, but not limited to, a memory bus, or memory controller; a peripheral bus; and a local bus using any of a variety of bus architectures.

Examples of computing devices that can be implemented using the computing device 400 include a desktop computer, a laptop computer, a tablet computer, a mobile computing device (such as a smart phone, a touchpad mobile digital device, or other mobile devices), or other devices configured to process digital instructions.

The system memory 404 includes read only memory 408 and random access memory 410. A basic input/output system 412 containing the basic routines that act to transfer information within computing device 400, such as during start up, can be stored in the read only memory 408.

The computing device 400 also includes a secondary storage device 414 in some embodiments, such as a hard disk drive, for storing digital data. The secondary storage device 414 is connected to the system bus 406 by a secondary storage interface 416. The secondary storage device 414 and its associated computer readable media provide non-volatile and non-transitory storage of computer readable instructions (including application programs and program modules), data structures, and other data for the computing device 400.

Although the example environment described herein employs a hard disk drive as a secondary storage device, other types of computer readable storage media are used in other embodiments. Examples of these other types of computer readable storage media include magnetic cassettes, flash memory cards, solid-state drives (SSD), digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 414 and/or system memory 404, including an operating system 418, one or more application programs 420, other program modules 422 (such as the software engines described herein), and program data 424. The computing device 400 can utilize any suitable operating system.

In some embodiments, a user provides inputs to the computing device 400 through one or more input devices 426. Examples of input devices 426 include a keyboard 428, mouse 430, microphone 432 (e.g., for voice and/or other audio input), touch sensor 434 (such as a touchpad or touch sensitive display), and gesture sensor 435 (e.g., for gestural input). In some implementations, the input device(s) 426 provide detection based on presence, proximity, and/or motion. Other embodiments include other input devices 426. The input devices can be connected to the processing device 402 through an input/output interface 436 that is coupled to the system bus 406. These input devices 426 can be connected by any number of input/output interfaces, such as a parallel port, serial port, game port, or a universal serial bus. Wireless communication between input devices 426 and the input/output interface 436 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 438, such as a monitor, liquid crystal display device, light-emitting diode display device, projector, or touch sensitive display device, is also connected to the system bus 406 via an interface, such as a video adapter 440. In addition to the display device 438, the computing device 400 can include various other peripheral devices (not shown), such as speakers or a printer.

The computing device 400 can be connected to one or more networks through a network interface 442. The network interface 442 can provide for wired and/or wireless communication. In some implementations, the network interface 442 can include one or more antennas for transmitting and/or receiving wireless signals. When used in a local area networking environment or a wide area networking environment (such as the Internet), the network interface 442 can include an Ethernet interface. Other possible embodiments use other communication devices. For example, some embodiments of the computing device 400 include a modem for communicating across the network.

The computing device 400 can include at least some form of computer readable media. Computer readable media includes any available media that can be accessed by the computing device 400. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 400.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 4 is also an example of programmable electronics, which may include one or more such computing devices, and when multiple computing devices are included, such computing devices can be coupled together with a suitable data communication network so as to collectively perform the various functions, methods, or operations disclosed herein.

In some implementations, the computing device 400 can be characterized as an ADAS computer. For example, the computing device 400 can include one or more components sometimes used for processing tasks that occur in the field of artificial intelligence (AI). The computing device 400 then includes sufficient proceeding power and necessary support architecture for the demands of ADAS or AI in general. For example, the processing device 402 can include a multicore architecture. As another example, the computing device 400 can include one or more co-processors in addition to, or as part of, the processing device 402. In some implementations, at least one hardware accelerator can be coupled to the system bus 406. For example, a graphics processing unit can be used. In some implementations, the computing device 400 can implement a neural network-specific hardware to handle one or more ADAS tasks.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method of performing multiband bass management in a vehicle, the method comprising:

separating, by an audio system in the vehicle, first bass audio information from an audio signal, the first bass audio information comprising all contents of the audio signal below a first frequency;

providing second bass audio information to each of multiple woofers of the audio system of the vehicle, the second bass audio information comprising all contents of the first bass audio information above a second frequency; and providing third bass audio information to fewer than all of the multiple woofers, the third bass audio information comprising all contents of the first bass audio information other than the second bass audio information, wherein at least one of the multiple woofers receives both the second bass audio information and the third bass audio information.

2. The method of claim 1, wherein the third bass audio information is provided to a first woofer of the multiple woofers.

3. The method of claim 2, wherein the third bass audio information is provided to the first woofer based on the first woofer having a greater enclosure size than at least a second woofer of the multiple woofers.

4. The method of claim 2, wherein the third bass audio information is provided to the first woofer based on woofer type.

5. The method of claim 4, wherein the third bass audio information is provided to multiple first woofers at a trunk region of the vehicle.

6. The method of claim 2, wherein the first woofer is positioned at a trunk region of the vehicle.

7. The method of claim 6, wherein a second woofer of the multiple woofers is positioned at a front of the vehicle, and wherein the second bass audio information, but not the third bass audio information, is provided to the second woofer.

8. The method of claim 7, wherein the vehicle has multiple second woofers at the front of the vehicle.

9. An audio system for a vehicle, the audio system comprising:

a non-woofer speaker;

first and second woofers;

a first filter separating first bass audio information from an audio signal before a remainder of the audio signal is provided to the non-woofer speaker, the first bass audio information comprising all contents of the audio signal below a first frequency;

a second filter for providing second bass audio information to the first and second woofers, the second bass audio information comprising all contents of the first bass audio information above a second frequency; and a third filter for providing third bass audio information to the first woofer and not to the second woofer, the third bass audio information comprising all contents of the first bass audio information other than the second bass audio information, wherein the first woofer receives both the second bass audio information and the third bass audio information.

10. The audio system of claim 9, wherein the first woofer has a greater enclosure size than the second woofer.

11. The audio system of claim 9, wherein the first woofer is of a different type than the second woofer.

12. The audio system of claim 9, further comprising at least two first woofers, wherein the second bass audio information is provided to the at least two first woofers, and wherein the third bass audio information is provided to the at least two first woofers.

13. The audio system of claim 9, wherein the first woofer is located at a trunk region of the vehicle.

14. The audio system of claim 13, wherein the second woofer is positioned at a front of the vehicle.

15. The audio system of claim 14, further comprising at least two second woofers positioned at the front of the vehicle, wherein the second bass audio information is provided to the at least two second woofers, and wherein the third bass audio information is not provided to the at least two second woofers.

* * * * *